United States Patent [19]
Valentine et al.

[11] 3,824,766
[45] July 23, 1974

[54] GAS PURIFICATION

[75] Inventors: John P. Valentine, Belle Mead;
Wilbert E. Luley, Mendham, both of N.J.

[73] Assignee: Allied Chemical Corporation, New York, N.Y.

[22] Filed: May 10, 1973

[21] Appl. No.: 359,032

[52] U.S. Cl................................ 55/48, 55/68, 55/73
[51] Int. Cl............................................ B01d 53/14
[58] Field of Search ............... 55/48, 51, 68, 73, 84, 55/93, 94; 208/340, 341

[56] References Cited
UNITED STATES PATENTS 3,531,917  10/1970  Gruneward et al. ................... 55/73
3,770,622  11/1973  Freireich et al. ...................... 55/68

*Primary Examiner*—Charles N. Hart
*Attorney, Agent, or Firm*—Gerard P. Rooney; Patrick L. Henry

[57] ABSTRACT

"Adiabatic" process for purification of a gas mixture containing principally methane together with carbon dioxide and minor amounts of hydrogen sulfide to remove substantially all the hydrogen sulfide while retaining most of the carbon dioxide in the gas mixture by means of a solvent medium comprising a normally liquid dialkyl ether of a polyalkylene glycol which has been cooled and saturated with carbon dioxide by direct contact with let-down pressure purified gas.

12 Claims, 1 Drawing Figure

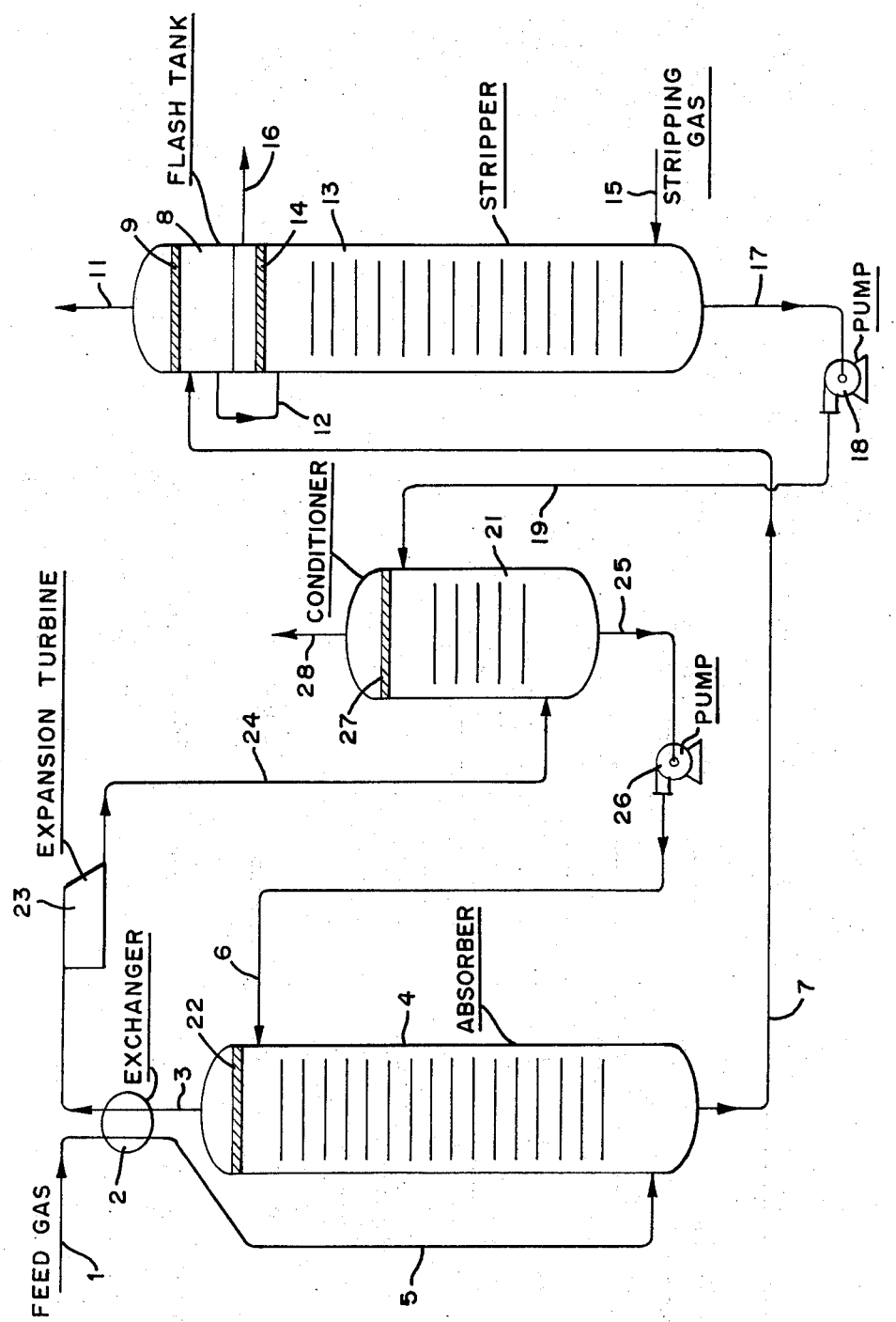

GAS PURIFICATION

This invention relates to the purification of gas and more particularly refers to a new and improved process for purification of a gas mixture containing methane together with carbon dioxide and hydrogen sulfide to remove substantially all the hydrogen sulfide while retaining most of the carbon dioxide in the gas mixture.

There is a natural gas shortage in many areas in the world. Other countries far distant have an excess of natural gas. The cost, complexities and difficulties in liquifaction of natural gas and building tankers for transporting the liquid natural gas is ever increasing. Methanol can be used satisfactorily in many instances as a fuel in place of natural gas and in some respects, despite its lower calorific value, has advantages over natural gas, particularly with regard to transportation wherein tankers of much lower cost can be employed by virtue of the fact that methanol is normally liquid.

Methanol is produced from synthesis gas, i.e., a gas composition of essentially two parts of hydrogen and one part carbon monoxide. Synthesis gas may be prepared from natural gas by reacting steam with methane to form hydrogen and carbon monoxide as shown in the equation below:

$$CH_4 + H_2O \rightarrow 3H_2 + CO$$

Since this reaction produces three moles of hydrogen to one mole of carbon dioxide, this mixture is deficient in carbon for subsequent methanol synthesis and additional carbon monoxide must be added to make up this deficiency. However, if carbon dioxide is included in the mixture of methane and steam, reaction products produced are carbon monoxide and hydrogen in the desired proportion of one mole carbon monoxide to two moles of hydrogen as illustrated in the equation below:

$$3CH_4 + CO_2 + 2H_2O \rightarrow 4CO + 8H_2$$

Thus, the importance of inclusion of carbon dioxide with methane for production of synthesis gas will be evident. Sulfur contaminants in the gas act as a poison to the methanol-synthesis catalyst and must be removed.

Some of the sources of natural gas are located in areas where water is in short supply and an operation which would not require consumption of water is, of course, desirable. Simplicity and efficiency of operation in these locations distant from skilled labor and materials would be beneficial.

In accordance with the present invention, a gas mixture containing principally methane together with carbon dioxide and minor amounts of hydrogen sulfide may be purified to remove substantially all the hydrogen sulfide while retaining most of the carbon dioxide in the gas mixture by (a) maintaining an absorption zone under superatmospheric pressure within the range of 400 to 2,000, preferably 500 to 1,500 pounds per square inch absolute, and at a temperature between 20° and 140° F., preferably 70° to 110° F.; (b) introducing a gas mixture containing principally methane together with carbon dioxide and minor amounts of hydrogen sulfide into the lower section of the absorption zone; (c) introducing as a solvent medium a normally liquid dialkyl ether of a polyalkylene glycol having 1 – 8 carbon atoms in each alkyl group and 3 – 8 ethylene units, preferably a dimethylether of a polyethylene glycol, desirably a mixture of dimethylethers of polyethylene glycols, containing dissolved carbon dioxide, preferably saturated with carbon dioxide, into the upper section of the absorption zone, said solvent medium having a temperature below the temperature in the absorption zone; (d) passing the solvent medium downwardly countercurrent to and in intimate direct contact with the uprising gas mixture to remove substantially all the hydrogen sulfide together with a minor portion of carbon dioxide from the gas mixture; (e) releasing the gas mixture containing methane and carbon dioxide and substantially free from hydrogen sulfide from the absorption zone; (f) reducing the pressure on said gas mixture from the absorption zone to effect cooling and expansion of said gas mixture; (g) passing the cooled gas mixture in direct contact with lean solvent in a conditioning zone to cool the solvent to a temperature below the temperature of the absorption zone and to saturate the lean solvent with carbon dioxide; (h) passing the cooled solvent containing dissolved carbon dioxide from the conditioning zone as solvent medium to the absorption zone for scrubbing the gas mixture containing hydrogen sulfide; (i) discharging the gas mixture containing methane and carbon dioxide and substantially free of hydrogen sulfide from the conditioning zone; (j) passing rich solvent containing hydrogen sulfide from the absorption zone to a stripping zone maintained at pressure below the absorption zone pressure, preferably a pressure of 12 to 100 pounds per square inch absolute and a temperature of about 70° to 300° F., preferably about 80° to 120° F., to volatilize the hydrogen sulfide contained in the solvent; (k) discharging the hydrogen sulfide from the stripping zone; and (1) passing the lean solvent from the stripping zone to the conditioning zone.

In a more specific embodiment the rich solvent from the absorption zone is first sent to a flashing zone to liberate minor amounts of methane and $CO_2$ dissolved in the rich solvent, and then the thus diluted solvent passed to the stripping zone for removal of hydrogen sulfide.

The accompanying drawing diagrammatically illustrates one method of carrying out the present invention.

Referring to the drawing, the feed gas is a gas mixture containing usually as a principal constituent methane together with substantial amounts of carbon dioxide and some hydrogen sulfide. Natural gas is a good source of feed gas since it contains a high percentage of methane and substantial amounts of carbon dioxide together with minor amounts of hydrogen sulfide and in addition, contains, frequently, inerts such as nitrogen as well as small amounts of other constituents such as higher molecular weight hydrocarbons. Feed gas may also be derived from fossil fuel such as petroleum, coal and shale. To make the feed gas suitable for conversion to synthesis gas and subsequently to methyl alcohol, the feed gas must be reduced in hydrogen sulfide content to a very low value of the order of 5 parts per million or less hydrogen sulfide. Removal of hydrogen sulfide from the feed gas should be accomplished while removing as little carbon dioxide as possible since the carbon dioxide retained in the gas is useful in the conversion of the gas to synthesis gas. As illustrative, a feed gas composition is given below:

FEED COMPOSITION (VOLUME %)

| | |
|---|---|
| $C_1$ | 63.0 |
| $C_2$ | 1.0 |
| $C_3$ | 0.4 |
| $C_4$ | 0.3 |
| $C_5$ | 0.1 |
| $H_2S$ | 3.5 |
| $CO_2$ | 12.7 |
| $N_2$ | 19.0 |

Feed gas under superatmospheric pressure of about 500 to 2,000 pounds per square inch absolute and at a temperature of about 100° to 150° F. flows through line 1 then through heat exchanger 2 where it passes in indirect heat exchange with gases released from the top of absorber 4 through line 3 thereby cooling the feed gas and condensing water contained therein prior to entering the bottom of absorber 4 through line 5. Absorber 4 may be any suitable tower filled with packing, such as Pall ring packing, or perforated plates, preferably valve trays to ensure good contact between liquid and gas in the tower. The solvent medium entering the top of absorber 4 through line 6 is a normally lqiuid dialkylether of a polyalkylene glycol, preferably a dialkylether of a polyethylene glycol having 1 – 8 carbon atoms in each alkyl group and 3 – 8 ethylene units, desirably the alkyls are methyl and the solvent is a mixture of the dimethylethers of polyethylene glycols. The solvent medium contains dissolved carbon dioxide and preferably is saturated with carbon dioxide. Heat is evolved when carbon dioxide is absorbed in the solvent. Specifically, the heat of absorption of carbon dioxide in the solvent is about 160 BUT's per pound. Thus, by employing a solvent medium comprising the dialkyl-ether of polyalkylene glycol containing dissolved carbon dioxide facilitates maintaining a lower temperature in absorption tower 4. In addition, the solvent medium should not only contain dissolved carbon dioxide but should also be cooled prior to entering the absorption tower 4 to a temperature below the temperature in the tower. In this manner a sharp temperature rise at the top of absorber tower 4 is prevented, as would otherwise occur, and thus provides more efficient hydrogen sulfide absorption.

The temperature of the tower may vary between about 20° F. and 140° F. and is preferably within the range of about 70° to 110° F. The temperature at the top of absorber 4 is usually lower than that at the bottom by about 10° to 20°. To minimize the differential in temperature between top and bottom and to maintain lower temperature in the absorber tower 4, the feed gas as previously mentioned is preferably cooled prior to entering the tower to a temperature below that in the tower by passing in indirect heat exchange with the gases leaving the tower in heat exchanger 2.

Solvent medium is introduced through line 6 into tower 4 at a rate sufficient to dissolve substantially all the hydrogen sulfide in the gas entering through line 5 and passing upward countercurrent to and in intimate contact with the solvent medium. The rate of solvent will vary dependent upon the concentration of acid gas and upon the temperature and pressure in the tower. Ordinarily, 0.05 to 10 gallons of solvent medium per standard cubic foot of acid gas will be adequate to remove all of the hydrogen sulfide from the feed gas. Hydrogen sulfide has a solubility in the solvent several times greater than that of carbon dioxide and as will be evident will readily dissolve in the solvent. Thus, a solvent medium saturated with carbon dioxide and cooled to a temperature below that in the absorption zone permits a lower solvent circulation rate as physical solvent absorption efficiencies improve with lower operating temperatures.

Rich solvent containing substantially all the hydrogen sulfide from the feed gas together with carbon dioxide and some hydrocarbon methane gas is directed into flash tank 8 maintained at a reduced pressure to permit liberation of a minor amount of gas comprising as its principal constituent methane. The liberated vapors pass up through flash tank 8, through entrainment knock-out section 9 which may be a plurality of baffles or other media on which the liquid droplets entrained in the gas collect, coalesce and drop back into the liquid body of solvent contained in flash tank 8. Normally a pressure in flash tank 8 of about 5 percent to 50 percent of the pressure in absorption tower 4 will permit liberation of the gas containing methane from the rich solvent entering through line 7. The gas released from the top of flash tank 8 through line 11 may be discharged from the system and burned as fuel or may be, if desired, returned to absorption column 4 for further recovery of the hydrocarbon content in the gas.

Rich solvent in flash tank 8 from which hydrocarbon gas has been liberated through line 11 flows through line 12 into stripper column 13 which may be any suitable packed tower or valve tray tower similar in construction to absorber column 4. The pressure in stripper column 13 is maintained below that of absorber 4, generally within the range of about 12 to 100 pounds per square inch absolute, preferably under substantially atmospheric pressure, i.e., about 0 to 10 pounds per square inch gauge, and the temperature may vary from a low of about 70° to about 300° F. dependent upon the pressure and amount of stripping gas, preferably the temperature will be maintained within the range of about 80° to 120° F. Stripping gas entering stripper 13 through line 15 may be any inert gas such as nitrogen, air, steam, methane or even waste gases as for example, purge gas from the methanol synthesis plant which contains nitrogen, carbon monoxide and hydrogen. The gases volatilized from the rich solvent together with stripping gas, pass upwardly through vessel 13, thence through entrainment knock-out section 14, similar in construction to knock-out entrainment section 9, for the purpose of preventing droplets of liquid from being carried over into the gas, and the gas mixture passing through entrainment knock-out section 14 containing hydrogen sulfide together with some carbon dioxide and stripping gas, as well as minor amounts of other constituents, discharges from the system through line 16. The gas containing hydrogen sulfide may be directed to a Claus plant for conversion of the hydrogen sulfide into elemental sulfur.

Although in the preferred method of operation, the rich solvent flowing from absorber 4 through line 7 is first subjected to flashing to remove some dissolved hydrocarbon gas, the flashing step may be omitted and the solvent flowing through line 7 may be directed directly to stripper 13 in which event the gases released from stripper 13 through line 16 willl contain a small amount of hydrocarbon gas, which hydrocarbon gas may not be detrimental to the operation of the Claus plant.

Lean solvent from the bottom of stripper 13 flows through line 17 and is forced by pump 18 through line 19 into conditioner 21 provided with packing or plates to facilitate contact between the liquid entering and gas introduced into the vessel 21.

Gas from absorber 4 substantially free of hydrogen sulfide passes up through entrainment knock-out section 22, thence through line 3 into expansion turbine 23 wherein the gas expands and drives the turbine thereby generating power and also during its expansion becomes colder as a result of the work being done and the Joule-Thompson effect. The amount of power generated by the expansion of the gas is several times that required to operate the plant. The surplus power can, of course be used for other purposes. The let down of pressure materially reduces the temperature of the gas by about 50 or more degrees fahrenheit.

The cooled gas from expansion turbine 23 flows through line 24 into conditioner 21 where it passes in intimate contact with the lean solvent entering through line 19. Direct contact of the cool gas entering through line 24 with the lean solvent entering line 19 in conditioner 21 has a dual effect providing both carbon dioxide absorption in the solvent and cooling of the solvent to a temperature below the temperature in the absorption column 4. The pressure is generally about 200 to 1,000 pounds per square inch lower than that of the absorber, preferably about 300 to 700 pounds lower.

Solvent medium, i.e., solvent substantially saturated with carbon dioxide and at a lower temperature, below that in absorber 4, discharges from conditioner 21 through line 25 and is forced by pump 26 through line 6 into the top of absorber 4 for scrubbing the incoming gases entering through line 5 to remove therefrom the hydrogen sulfide. Gases entering conditioner 21 through line 24 after cooling lean solvent and saturating the lean solvent with carbon dioxide gas, flows through entrainment knock-out section 27 and thence discharges from the system through line 28. The gas from line 28 is substantially free of hydrogen sulfide, i.e., contains less than about 5 parts per million hydrogen sulfide and retains most of its original content of carbon dioxide and is suitable for conversion into synthesis gas for the production of methane.

The process of the present invention offers the following features:

1. Totally "adiabatic" plant operation - addition or extraction of the heat by an external source is not required.

2. Complete plant cooling requirements supplied by gas pressure let-down cooling. In many areas there is a serious shortage of cooling water.

3. Supplemental brake horsepower available from pressure let-down more than equal to total plant power requirements so as to provide excess power for use in the methanol plant or for other purposes.

4. Dual use of a conditioner vessel to effect physical contact between expanded cooled gas from the absorber with lean solvent to produce a solvent medium saturated with carbon dioxide and which has a lower temperature than the absorption zone. This prevents a sharp temperature rise at the top of the absorber as would otherwise occur, and thus provides more efficient hydrogen sulfide absorption and also permits a lower solvent circulation rate since solvent absorption efficiencies improve with lower operating temperatures.

5. Use of a physical solvent to preferentially absorb $H_2S$ over $CO_2$ and thus accomplish full $H_2S$ absorption while retaining $CO_2$ in the product gas to the methanol plant where the carbon monoxide from the $CO_2$ can provide a higher conversion rate to methanol.

6. The use of purged gas from the methanol recycle loop as a solvent stripping gas.

7. The use of the separated hydrogen sulfide gas for conversion by the Claus process to elemental sulfur.

The following example illustrates the present invention.

EXAMPLE 1

In an operation as illustrated in the drawing, feed gas containing principally methane together with carbon dioxide and hydrogen sulfide (the composition of the feed is shown in the tabulation which follows) at a pressure of 1,000 pounds per square inch absolute and a temperature of 120° F. is cooled to 94° F. by indirect heat exchange with gases leaving the absorption column. Solvent medium composed of a mixture of the normally liquid dimethylethers of polyethylene glycols containing 3 - 8 ethylene units and saturated with carbon dioxide is introduced at a temperature of 70° F. and at a rate of 9,400 gallons per minute into the top of the absorption column where it flows down through 60 trays in the absorber countercurrent to and in intimate contact with the feed gas passing upwardly through the absorber column. The rich solvent having absorbed substantially all the hydrogen sulfide in the feed gas discharges from the bottom of the absorber at a temperature of 108° F. into a flash tank wherein gases designated "off-gas No. 1" and containing as a primary constituent methane, are released from the top of the flash tank. The liquid in the flash tank is kept at about a half level, i.e., the flash tank is kept about half filled with liquid, and is retained in the flash tank for a residence time of approximately one minute.

The liquid from the flash tank is transferred to a stripper column containing 30 trays and maintained at a pressure of 18 pounds per square inch gauge. Into the bottom of the stripping column inert stripping gas is introduced and removes from the rich solvent the hydrogen sulfide together with carbon dioxide which are discharged from the stripper column and designated "off-gas No. 2."

Lean solvent from the stripping column at a temperature of 91° F. is pumped into a conditioner chamber which is a vessel containing five trays. Gas from the top of the absorber substantially free of hydrogen sulfide is passed through an expansion turbine thereby generating 27,000 brake horsepower. The cooled gas from the expansion turbine at a temperature of 12° F. is introduced into the conditioner in direct contact with the lean solvent thereby saturating the lean solvent with carbon dioxide gas and cooling the lean solvent to a temperature of 69° F. The product released from the top of conditioner chamber maintained at a pressure of 425 pounds per square inch absolute consists primarily of methane together with most of the carbon dioxide in the feed gas but is reduced in hydrogen sulfide content to a value of 5 parts per million. The solvent medium from the conditioner is pumped at the rate of 9,400 gallons per minute and at a temperature of 70° F. into the top of the absorber for scrubbing of the feed gas. Power consumption for pumping the lean solvent from the bottom of the stripper to the conditioner chamber is 3,400 brake horsepower and the power consumption for pumping the solvent medium from the conditioner to the top of the absorber is 3,550 brake horsepower — totalling 6,950 brake horsepower. The power generated by the expansion turbine is 27,000 brake horsepower.

The composition of the feed and products and the rate of flow per hour is given in the tabulation below:

MOL BALANCE — MOLS PER HOUR

|  | Feed | Product | Off Gas No. 1 | Off Gas No. 2 | Stripping Gas |
|---|---|---|---|---|---|
| $C_1$ | 81,700 | 79,860 | 1,275 | 565 | — |
| $C_2$ | 1,325 | 1,210 | 41 | 74 | — |
| $C_3$ | 520 | 419 | 18 | 83 | — |
| $C_4$ | 429 | 267 | 14 | 148 | — |
| $C_5$ | 182 | 32 | 5 | 145 | — |
| $H_2S$ | 4,590 | (5 ppm) | 160 | 4,430 | — |
| $CO_2$ | 16,450 | 13,160 | 605 | 2,685 | — |
| $N_2$ | 24,700 | 24,572 | 98 | 30 | — |
| $H_2O$ | 142 | 21 | 1 | 126 | 6 |
| Inert | — | — | — | 15,000 | 15,000 |
| TOTAL | 130,038 | 119,541 | 2,217 | 23,286 | 15,006 |

We claim:

1. A process for purification of a gas mixture containing principally methane together with carbon dioxide and minor amounts of hydrogen sulfide to remove substantially all the hydrogen sulfide while retaining most of the carbon dioxide in the gas mixture which comprises:
   a. maintaining an absorption zone under super atmospheric pressure within the range of about 400 to 2,000 pounds per square inch absolute, and a temperature between about 20° and 140° F.;
   b. introducing a gas mixture containing principally methane together with carbon dioxide and minor amounts of hydrogen sulfide into the absorption zone;
   c. introducing as a solvent medium a normally liquid dialkyl ether of a polyalkylene glycol containing dissolved carbon dioxide into the absorption zone; said solvent medium having a temperature below the temperature in the absorption zone;
   d. passing the solvent medium downwardly countercurrent to and in intimate direct contact with the uprising gas mixture to remove substantially all the hydrogen sulfide together with a minor portion of carbon dioxide from the gas mixture;
   e. releasing the gas mixture containing methane and carbon dioxide and substantially free of hydrogen sulfide from the absorption zone;
   f. reducing the pressure on said gas mixture from the absorption zone to effect cooling and expansion of said gas mixture;
   g. passing the cooled gas mixture in direct contact with lean solvent in a conditioning zone to cool the solvent to a temperature below the temperature of the absorption zone and to dissolve carbon dioxide in the lean solvent;
   h. passing the cooled solvent containing dissolved carbon dioxide from the conditioning zone as solvent medium to the absorption zone for scrubbing the gas mixture containing hydrogen sulfide;
   i. discharging the gas mixture containing methane and carbon dioxide and substantially free of hydrogen sulfide from the conditioning zone;
   j. passing rich solvent containing hydrogen sulfide from the absorption zone to a stripping zone maintained at pressure below the absorption zone pressure, and at a temperature of about 70° to 300° F. to volatilize the hydrogen sulfide contained in the solvent;
   k. discharging the volatilized hydrogen sulfide from the stripping zone; and
   l. passing the lean solvent from the stripping zone to the conditioning zone for cooling and solution of carbon dioxide to thus produce a solvent medium.

2. A process as claimed in claim 1 wherein the rich solvent from the absorption zone is first sent to a flashing zone to liberate minor amounts of methane and $CO_2$ dissolved in the rich solvent, and the thus denuded solvent passed to the stripping zone for removal of hydrogen sulfide.

3. A process as claimed in claim 1 wherein an inert gas is introduced into the stripping zone to aid in volatilizing the hydrogen sulfide contained in the solvent.

4. A process as claimed in claim 3 wherein the stripping gas is purge gas from the methanol synthesis operation.

5. A process as claimed in claim 1 wherein the lean solvent is saturated with carbon dioxide in the conditioning zone.

6. A process as claimed in claim 1 wherein the gas mixture from the absorption zone undergoing expansion is used to drive an expansion turbine to generate power.

7. A process as claimed in claim 1 wherein the gas mixture entering the absorption zone is first passed in indirect heat exchange with the gases leaving the absorption zone to cool the gas mixture to a temperature below the temperature in the absorption zone prior to entering the absorption zone.

8. A process as claimed in claim 1 wherein the gas mixture to be purified in natural gas.

9. The process as claimed in claim 1 wherein the absorption zone is maintained at a pressure of 500–1,500 pounds per square inch absolute and the temperature is between 70° and 110° F.

10. A process as claimed in claim 1 wherein the solvent is a mixture of dimethyl ethers of polyethylene glycols having 3–8 ethylene units.

11. A process for purification of natural gas containing principally methane together with carbon dioxide and minor amounts of hydrogen sulfide to remove substantially all the hydrogen sulfide while retaining most of the carbon dioxide in the gas mixture which comprises:
   a. maintaining an absorption zone under superatmospheric pressure within the range of about 500 to 1,500 pounds per square inch absolute, and a temperature between about 70° and 110° F.;

b. passing the natural gas in indirect heat exchange with gas leaving the absorption zone to effect cooling of the natural gas entering the absorption zone to a temperature below the temperature in the absorption zone;
c. introducing the cooled natural gas containing principally methane together with carbon dioxide and minor amounts of hydrogen sulfide into the lower section of the absorption zone;
d. introducing as a solvent medium, a mixture of dimethyl ethers of polyethylene glycols having 3 – 8 ethylene units saturated with carbon dioxide into the upper section of the absorption zone, said solvent medium having a temperature below the temperature in the absorption zone;
e. passing the solvent medium downwardly countercurrent to and in intimate direct contact with the uprising gas mixture to remove substantially all the hydrogen sulfide together with a minor portion of carbon dioxide from the gas mixture;
f. releasing the gas mixture containing the methane and carbon dioxide and substantially free of hydrogen sulfide from the absorption zone and passing said released gas mixture in indirect heat exchange with incoming natural gas feed;
g. reducing the pressure on said gas mixture from the absorption zone to effect cooling and expansion of said gas mixture;
h. passing said gas mixture into an expansion turbine to generate power;
i. passing the cooled gas mixture in direct contact with lean solvent in a conditioning zone to cool the solvent to a temperature below the temperature of the absorption zone and to saturate the lean solvent with carbon dioxide;
j. passing the cooled solvent containing dissolved carbon dioxide from the conditioning zone as solvent medium to the absorption zone for scrubbing the gas mixture containing hydrogen sulfide;
k. discharging the gas mixture containing methane and carbon dioxide and substantially free of hydrogen sulfide from the conditioning zone;
l. passing rich solvent containing hydrogen sulfide together with minor amounts of methane to a flashing zone to liberate minor amounts of methane dissolved in the rich solvent;
m. passing the rich solvent containing hydrogen sulfide from the flashing zone to a stripping zone maintained at a pressure of 12 to 100 pounds per square inch absolute and at a temperature of 80° to 120° F. to volatilize the hydrogen sulfide contained in the solvent;
n. discharging the hydrogen sulfide from the stripping zone; and
o. passing the lean solvent from the stripping zone to the conditioning zone.

12. A process as claimed in claim 1 wherein the gas mixture to be purified is derived from fossil fuel.

* * * * *